United States Patent [19]

Kober

[11] 4,172,283

[45] Oct. 23, 1979

[54] COMPUTER SYSTEM COMPRISING AT LEAST TWO INDIVIDUAL COMPUTERS AND AT LEAST ONE SYSTEM BUS BAR

[75] Inventor: Rudolf Kober, Munich, Fed. Rep. of Germany

[73] Assignee: Siemens Aktiengesellschaft, Berlin & Munich, Fed. Rep. of Germany

[21] Appl. No.: 858,796

[22] Filed: Dec. 8, 1977

[30] Foreign Application Priority Data

Dec. 10, 1976 [DE] Fed. Rep. of Germany ....... 2656086

[51] Int. Cl.$^2$ ............................................. G06F 15/16
[52] U.S. Cl. ................................................... 364/200
[58] Field of Search ......................... 364/200 MS File

[56] References Cited

U.S. PATENT DOCUMENTS

| | | | |
|---|---|---|---|
| 3,343,135 | 9/1967 | Freiman et al. | 364/200 |
| 3,593,300 | 7/1971 | Driscoll, Jr. et al. | 364/200 |
| 3,629,854 | 12/1971 | Hauck et al. | 364/200 |
| 4,032,899 | 6/1977 | Jenny et al. | 364/200 |
| 4,047,159 | 9/1977 | Boudry | 364/200 |

*Primary Examiner*—Raulfe B. Zache
*Attorney, Agent, or Firm*—Hill, Van Santen, Steadman, Chiara & Simpson

[57] ABSTRACT

A computer system comprises at least two individual computers and at least one system bus bar which is composed of a system data bus and a system address bus. In each case, between one of the individual computers and the system bus bar there is arranged a traffic memory which is designed for optional access from the system bus bar or from the individual computer. The system bus bar has n (where n=2, 3 . . .) system data buses for word-parallel traffic of n data words, and each traffic memory is designed for optional word-parallel access in n-times word width from the system data buses or word-sequential access in single word width from the individual computer or from one of the system data buses.

4 Claims, 5 Drawing Figures

COMPUTER SYSTEM COMPRISING AT LEAST TWO INDIVIDUAL COMPUTERS AND AT LEAST ONE SYSTEM BUS BAR

BACKGROUND OF THE INVENTION

1. Field of the Invention

The present invention relates to a computer system comprising at least two individual computers and at least one system bus bar, and more particularly to such a system in which the system bus bar comprises a system data bus and a system address bus, and wherein between one of the individual computers and the system bus bar there is arranged, in each case, a traffic memory which is designed for optional access from the system bar or from the individual computer.

2. Description of the Prior Art

In my earlier U.S. patent application, Ser. No. 732,988, I describe a computer system of the type generally referred to above. In this computer system, the entire data traffic is carried out sequentially by way of the system bus bar. The system data bus serves to transmit data whose width is equal to the processing width (word width) of the individual computers, and the system address bus serves to transmit the associated memory addresses. The traffic memories which serve as coupling elements are alternately connected either to the individual computers (therein referred to as the autonomous phase) or to the system bus bar (therein referred to as control and data exchange phases.

The efficiency of computer systems comprising a plurality of individual computers is generally dependent upon the speed of the information exchange between the individual computers. This efficiency is the greater, the more rapid the information exchange can take place.

SUMMARY OF THE INVENTION

The object of the present invention is to improve upon a computer system of the type mentioned above in such a manner that accelerated data traffic is facilitated.

The object of the invention is realized in that the system bus bar has n (where n=2, 3, . . .) system data buses for word-parallel traffic of n data words, and that each traffic memory is designed for optional word-parallel access in n-times word width from the system data buses or word-sequential access in single word width from the individual computer or from the system data bus. In this manner, it is possible to simultaneously transmit a block of n data words on the system bus bar and to store this block in the traffic memories, whereby the data traffic between the traffic memories can be considerably speeded up.

Advantageously, a memory which is designed for optional word-parallel access in n-times word width or for word-sequential access in single word width, in particular a traffic memory of the type described above, is designed in such a way that it possesses n storage components, and that it possesses an access control circuit which is designed for optional access from n data word input/outputs in parallel to the n storage components, or to each of the storage components from an additional data word/output, and that it possesses a controllable address decoder unit which is designed in such a manner that a first addressing mode can be selected from a first address input or a second addressing mode can be selected from a first or second address input, where the first addressing mode consist in that each address which has an input at the first input address an associated storage position for a data word in each storage component, and where the second addressing mode consists in that each address which has been input at the first or second address input addresses an associated storage position for a data word only in an assigned storage component.

In an advantageous embodiment of the invention, a memory of this kind possesses an access control unit wherein the data word input/outputs are connected, by means of data buses, in parallel with the data word input/outputs of the storage components, wherein for these data buses there is provided at least one bus driver which can be optionally switched over from one transmission direction to the opposite simultaneously for all these data buses, and which can be locked or unlocked by way of at least one locking/unlocking input simultaneously for all these data buses, wherein the data word input/outputs of the storage components are connected by means of further data buses to the additional data word input/output, wherein for these further data buses there is provided a bus driver which, selectively, can be locked by way of at least one locking input simultaneously for all the further data buses, or can be unlocked by way of an unlocking input provided for this purpose separately for each further data bus, and which can be selectively switched over from one transmission direction to the opposite at least simultaneously for all the further data buses by way of at least one transfer input. Furthermore, in an advantageous embodiment of the invention, a memory of this type has an address decoder unit wherein a first bus driver is provided with at least one fixed transmission direction which can be selectively locked or unlocked by way of at least one locking/unlocking input, and a second bus driver is provided with at least one fixed transmission direction which can likewise be selectively locked or unlocked by way of at least one locking/unlocking input. The data word input of the first bus which is connected to the first address input, and the data word input of the other bus switch is connected to the second address input. The address inputs of the storage components are connected by means of address buses, on the one hand, to a data word output component of the data word output of the first bus driver, which always contains a data word address component of an address input by way of the first address input, and, on the other hand, to a data word output component of the data word output of the second bus driver which likewise always contains the data word address component of an address input via the second address input. A second data word output component of the data word output of the first bus driver, which always contains a storage component address component of an address which has been input by way of the first data input, and a second data word output component of the data word output of the second bus driver which always contains the storage component address component of an address which has been input via the second address input are connected to an address input of a 1-out-of-n decoder unit. Each of the n outputs of this 1-out-of-n decoder unit is connected to a first input, in each case, of one of n controllable locking circuits. Each of the locking circuits is assigned to a storage component, and releases or blocks the input of an address into this assigned storage component in dependence upon whether it has been selected by the 1-out-of-n decoder unit or not. Each of the locking circuits has a second input by way of which the input of an address into the storage component can be released by a release signal, independently of the first input.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
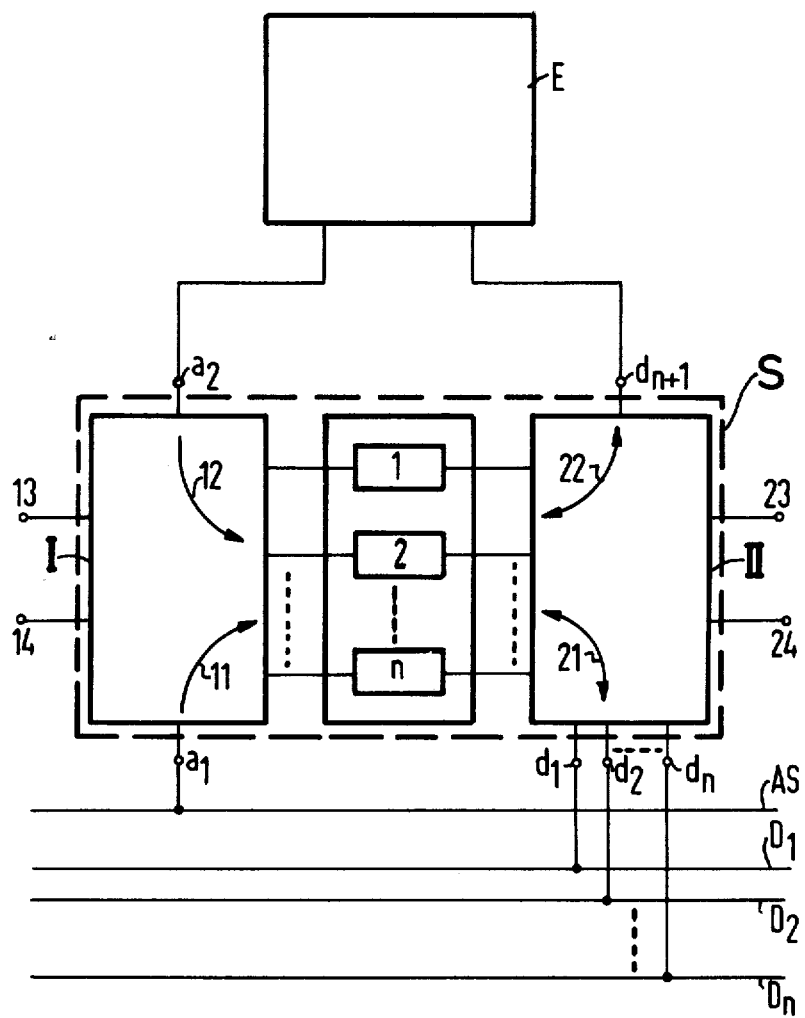
FIG. 1 is a block diagram representation an extract of the computer system of the type described above, comprising a memory, of the type described above, as a traffic memory.

Referring to FIG. 1, the system bus bar comprises an address bus AS and n system data buses $D_1$, $D_2$ to $D_n$. As illustrated, n data words can be transmitted in parallel on these n system data buses. The memory S which serves as the traffic memory has n data word inputs and outputs $d_1$, $d_2$ to $d_n$ and an additional data word input and output $d_{n+1}$. Each of the n data word inputs and outputs $d_1$, $d_2$ to $d_n$ is connected to one of the system data buses $D_1$, $D_2$ to $D_n$, whereas the additional data word input and output $d_{n+1}$ is connected to the individual computer E. A first address input $a_1$ of the memory S is connected to the system address bus AS, and a second address input $a_2$ is connected to the individual computer E. According to the invention, the memory S is designed in such a manner that it is selectively possible to effect word-parallel access in n-times data width from the n system data buses $D_1$, $D_2$ to $D_n$, or word-sequential access in single word widths from the individual computer E or from the system data bus. This means that, on the one hand, an address will, by way of the address input $a_1$, address n data word storage positions in the memory, into which, by way of the data word inputs and outputs $d_1$ to $d_n$, n data words can be written in parallel from the n system data buses $D_1$ to $D_n$, or from which, by way of the data word inputs and outputs, the stored data word can be read out in parallel onto the n system data buses, and that, on the other hand, an address which has been input by way of the address input $a_1$ or $a_2$ addresses a storage position for a data word in the memory into which, by way of the data word input and output $d_{n+1}$ or by way of the data word inputs and outputs $d_1$ to $d_n$, a data word is written from the computer, or out of which a data word is read and written into the individual computer or onto the data bus assigned to the storage component.

A memory S which selectively facilitates a word-parallel access in n-times word widths or a word-sequential access in single word width, here is advantageously designed in such a manner that it possesses n storage components 1, 2 to n (see FIG. 1). An access control circuit II selectively facilitates access from the n data word inputs and outputs $d_1$, $d_2$ to $d_n$ in parallel to the n storage components or access to each of the storage components from the additional data word input and output $d_{n+1}$. For this purpose, it is constructed in such a manner that, on the one hand, the data path can be transferred, i.e. the data path runs either from the data word inputs and outputs $d_1$, $d_2$ to $d_n$ to the storage components or from the data word input and outputs $d_{n+1}$ to the storage components, and that, on the other hand, for every such path, the data flow direction can be transferred, i.e. on a selected path a data flow can take place optionally in both directions. In FIG. 1, the one data path is symbolically represented by the double-headed arrow 21, and the other data path is symbolically represented by the double-headed arrow 22. The arrow directions here indicate the selectable data flow directions. Transfer from one data channel to the other takes place by way of a transfer input 23, whereas transfer from one data flow direction to the other takes place by way of a transfer input 24. A controllable address decoder unit I selectively facilitates a first addressing mode from the first address input $a_1$ or a second addressing mode from the first address input $a_1$ or from the second address input $a_2$. Here, the first addressing mode consists in that each address which has been input at the first input $a_1$ addresses an associated storage position for a data word in every storage component, and the second addressing mode consists in that each address which has been input at the first address input $a_1$ or the second address input $a_2$ addresses an assigned storage position for a data word only in an assigned storage component. For this purpose, it is constructed in such a manner that, on the one hand, the address channel can be switched over, i.e. either the path from the address input $a_1$ in the direction of the arrow 11 to the storage components, or else the path from the address input $a_2$ in the direction of the arrow 12 to the storage components can be selected, and that, on the other hand, it is possible to transfer from the first addressing mode to the other. The transfer of the address path is effected in FIG. 1 by way of the transfer input 13, whereas the transfer of the addressing mode is effected by way of the transfer input 14.

Figure 2:
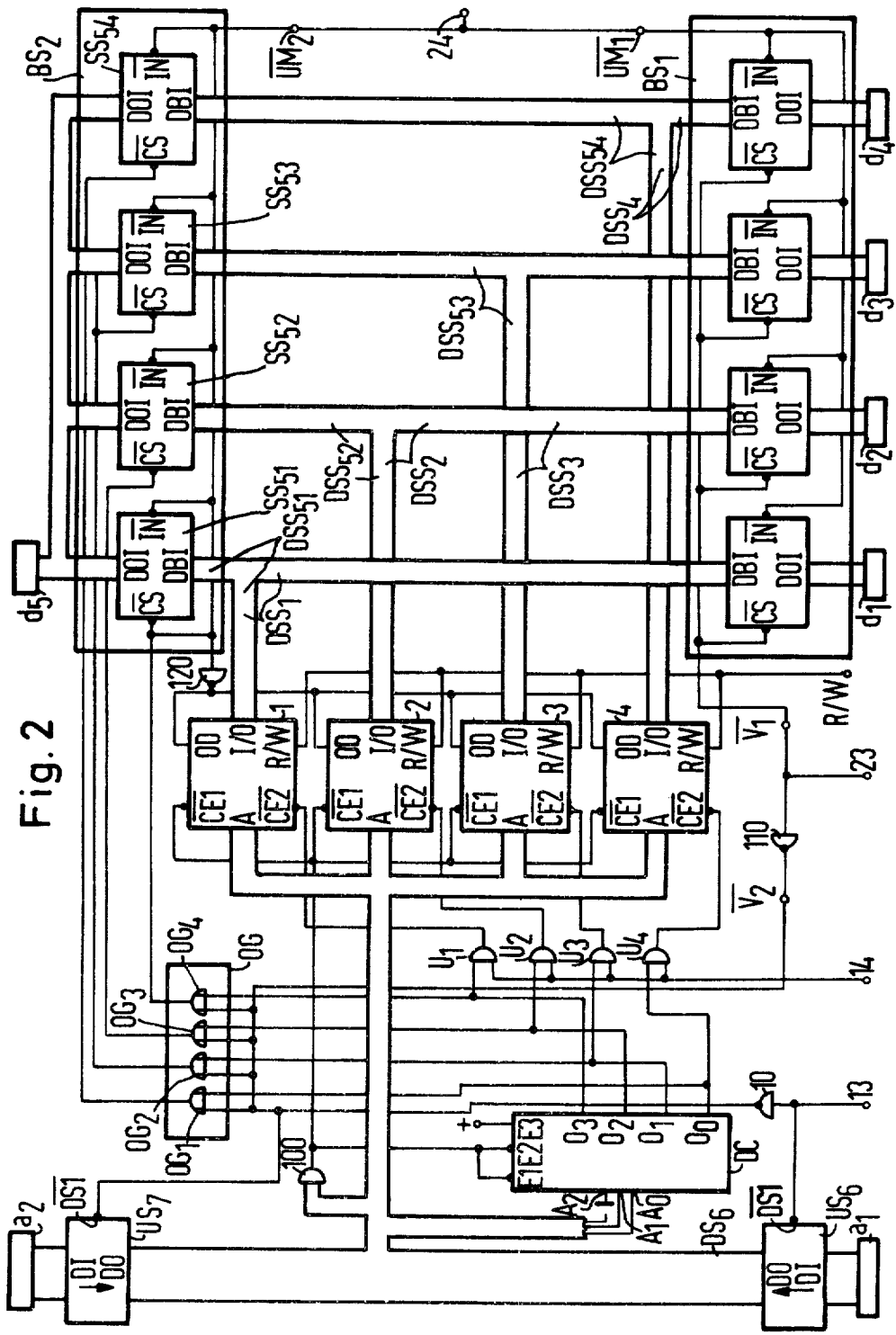
FIG. 2 is a logic diagram of an exemplary embodiment of a memory constructed in accordance with the present invention.

FIG. 2 illustrates an exemplary embodiment of the memory S for an individual computer having a word width of eight bits. The modules used are those produced by Intel Corporation (see Intel Data Catalog 1976). The designations of the relevant terminals of these modules can form with those given in the catalog. Each of the n storage components 1, 2 to 4 in FIG. 2 is constructed in the same manner from two modules of the type 8111-2 (256×4 bit-write/read memories).

Figure 3:
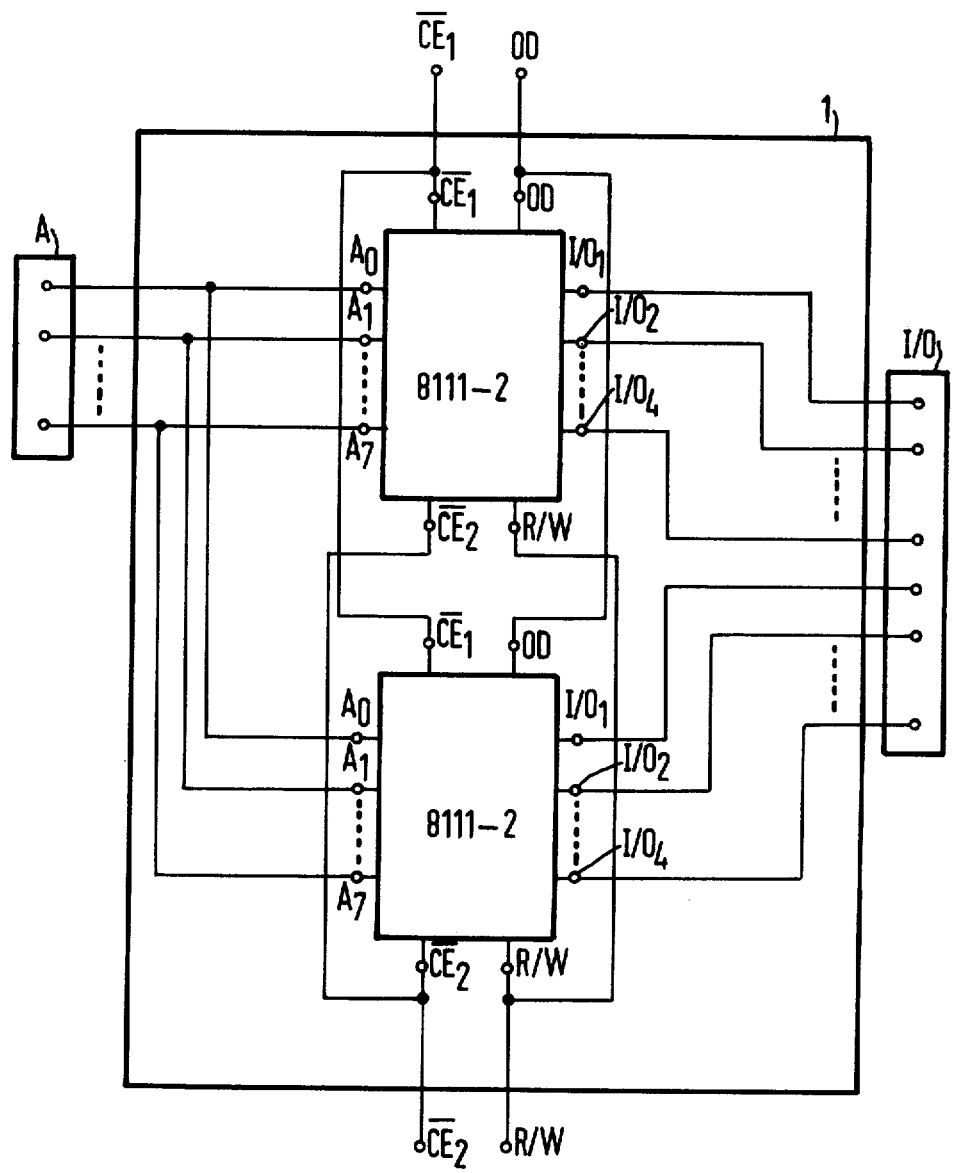
FIG. 3 is a logic representation illustrating the construction of a storage component of the exemplary embodiment of the invention illustrated in FIG. 2 using known circuit modules.

FIG. 3 illustrates the construction of the storage component 1 of FIG. 2. Each of the 8111-2 modules has eight inputs $A_0$ to $A_7$ for an eight-bit address and four common inputs and outputs $I/o_1$ to $I/o_4$ for the input and output of a four-bit data word. The eight inputs $A_0$ to $A_7$ are combined in FIG. 3 to form an eight-bit address input A of the storage component. The inputs and outputs $I/o_1$ to $I/o_4$ of the one module and those of the other module together form a symbolic eight-bit data word input and output I/o of the storage component. Each module also has two negated terminals $\overline{CE}_1$ and $\overline{CE}_2$ (the horizontal stroke above a reference of an input indicates here, and in the following, that the digital input signal with which it is fed is active in the logic "0" state), and has one input OD and a read/write input R/W. The last-mentioned inputs of the individual modules are connected to a like-referenced input of the storage component. The mode of operation of the inputs $\overline{CE}_1$, $\overline{CE}_2$, OD and R/W can be gathered from the following logic functions:

Read-out: OD·$\overline{CE}_1$·$\overline{CE}_2$="1" (R=W), and

Write-in: $\overline{R/W}$·$\overline{CE}_1$·$\overline{CE}_2$="1" (R=$\overline{W}$), where · signifies a logic AND and "1" signifies a logic 1.

In the exemplary embodiment illustrated in FIG. 2, the access control circuit II is constructed in such a manner that the four data word inputs and outputs $d_1$ to $d_4$ are connected in parallel by way of four data word buses $DSS_1$ to $DSS_4$ to the data word inputs and outputs I/o of the four storage components 1 to 4, by way of an interposed, bidirectional bus switch $BS_1$ which can be locked via a locking input $\overline{V}_1$ and can be transferred by way of a transfer input $\overline{UM}_1$. Furthermore, the data word input I/o of each storage component is connected to the additional data word input and output by way of a data bus $DSS_{51}$ to $DSS_{54}$ and by way of a bidirectional bus switch $BS_2$ which can be locked by way of a locking input $\overline{V}_2$ and by way of a transfer input $\overline{UM}_2$. The transfer inputs $\overline{UM}_1$ and $\overline{UM}_2$ of these bus switches $BS_1$ and $BS_2$ are connected to the transfer input 24 for the transfer of the data flow direction. This transfer input 24 is simultaneously connected by way of an inverter 120 to the input OD of every storage component. The locking inputs $\overline{V}_1$ and $\overline{V}_2$ are connected to the locking input 23, and an inverter 110 is connected into the connection line between the input 23 and the locking input $\overline{V}_2$. As can be seen from FIG. 2, each of the bidirectional bus switches $BS_1$ and $BS_2$ has four bidirectional bus switches $SS_1$ and $SS_4$, and $SS_{51}$ to $SS_{54}$, in each case for an eight-bit data word. Each of these bus switches $SS_1$ to $SS_4$ and $SS_{51}$ to $SS_{54}$ is arranged in one of the data buses $DSS_1$ to $DSS_4$ and $DSS_{51}$ to $DSS_{54}$. All of these bus switches have the same construction, although this is not essential. Each has a locking input $\overline{CS}$, a transfer input $\overline{IN}$, a first eight-bit data word input and output DOI, and a second eight-bit data word input and output DBI. The second data word input and output DBI is in each case provided for connection to the relevant storage component, whereas the first data word input and output DOI is provided for connection to the particular member of the data word inputs and outputs $D_1$ to $D_4$ and $D_5$. The locking inputs $\overline{CS}$ of the bus switches $SS_1$ to $SS_4$ are connected to the locking input $\overline{V}_1$, and the locking inputs $\overline{CS}$ of the bus switches $SS_{51}$ to $SS_{54}$ are connected to the locking input $\overline{V}_2$. Similarly, the transfer inputs $\overline{IN}$ of the bus switches $SS_1$ to $SS_4$ are connected to the input $\overline{UM}_1$, and those of the bus switches $SS_{51}$ to $SS_{54}$ are connected to the input $\overline{UM}_2$. Whereas, however, the inputs $\overline{CS}$ of the bus switches $SS_1$ to $SS_4$ are directly connected to the input $\overline{V}_1$, the connection of the locking input $\overline{V}_2$ to the inputs $\overline{CS}$ of the bus switches $SS_{51}$ to $SS_{54}$ is effected by way of a logic circuit OG. This logic circuit comprises four (generally n) OR gates $OG_1$ to $OG_4$, each gate having at least two inputs. One input of each gate is connected to the locking input $\overline{V}_2$, and each gate has its output connected to a respective input $\overline{CS}$ of the bus switches $SS_{51}$ to $SS_{54}$. As will be explained below in further detail, the logic circuit serves as a selector circuit. The second input of every gate is, for this purpose, connected to an output of a decoder unit DC.

In the exemplary embodiment illustrated herein, the address decoder unit I is constructed in such a manner that the two address inputs $a_1$ and $a_2$ are 16-bit inputs. The address input $a_1$ is connected to the address input $a_2$ by way of a unidirectional bus switch $US_6$ which can be locked by way of a locking input $\overline{DS}_1$, having a data flow direction $a_2$ by way of a 16-bit data bus $DS_6$, and by way of a unidirectional bus switch $US_7$ which can be locked by way of a locking input $\overline{DS}_1$ having a data flow direction $a_1$. Each eight-bit address input a of a storage component 1 to 4 is connected to eight lines of the data bus $DS_6$. Two further lines of the data bus $DS_6$ are connected to a two-bit input $A_0$ of a 1-out-of-4 decoder DC. Each of the four outputs $O_0$ to $O_3$ of this 1-out-of-4 unit is connected in each case by way of an AND gate $U_1$ to $U_4$ to the input $\overline{CE_2}$ of a storage component 1 to 4. A second input of every AND gate is connected to the transfer input 14 for transferring the addressing mode. The transfer input 13 is connected to the locking input $\overline{DS}_1$ of the bus switch $US_6$ and by way of an inverter 10 to the locking input $DS_1$ of the bus switch $US_7$. Each output $O_0$ to $O_3$ of the 1-out-of-4 decoder unit DC is connected to the second input of one of the OR gates $OG_1$ to $OG_4$.

Before the construction of the unidirectional bus switches $US_6$ and $US_7$, of the 1-out-of-4 decoder unit DC, and of the bidirectional bus switches $SS_1$ and $SS_4$ and $SS_{51}$ to $SS_{54}$ is discussed in detail, the mode of operation of the exemplary embodiment illustrated in FIG. 2 will be described.

Each address is composed of an eight-bit address for addressing a storage position for a data word in each of the storage components, and of a two-bit address for addressing one of the storage components. The remaining six available bits of the 16-bit data bus $DS_6$ are per se superfluous. If "0" is connected to the input 13 and to the input 23, all the bidirectional bus switches $SS_1$ to $SS_4$ and the unidirectional bus switch $US_6$ are unlocked, whereas the bidirectional bus switches $SS_{51}$ to $SS_{54}$, independently of the output state of the 1-out-of-4 decoder unit DC, and the unidirectional bus switch $US_7$ are locked. In this case, a transfer has been made to the address path 11 and tha data path 21 illustrated in FIG. 1.

If "0" is connected to the input 14, all the inputs $\overline{CE_2}$ of the storage components 1 to 4, independently of the output state of the 1-out-of-4 decoder unit DC are connected to "1" (note the inversion). The inputs $\overline{CE_1}$ of all the storage components are always connected to "0". The eight-bit address component of an address which has been input by way of the address input $a_1$ in this case addresses a storage position for a data word in each of the storage components. If data words are to be written into the storage positions in parallel from the data word inputs and outputs $d_1$ to $d_4$, the n read-write inputs R/W are connected to "0", whereas "0" is connected to the input direction transfer input 24. In this case, the bidirectional bus switches $SS_1$ to $SS_4$ are switched to the transmission direction from DOI to DBI. If data words are to be read out in parallel from the address storage positions into the storage components, the read/write inputs R/W are connected to "1", whereas "1" is connected to the direction transfer input 24. Now the storage components 1 to 4 are set at read and the bidirectional bus switches $SS_1$ to $SS_4$ are set at the direction from DBI to DOI. In this case four data words are read out in parallel from the four storage components by way of the data word input/outputs $d_1$ to $d_4$.

If, however, a "1" is connected to the address mode transfer input 14, "1" is connected to the inputs $\overline{CE_2}$ of the storage components, when "1" is present at the associated member of the outputs $O_1$ to $O_4$ of the decoder unit DC. A "0" is connected only to the input $\overline{CE_2}$ of the storage component whose associated output of the outputs $O_1$ to $O_4$ displays a "0". If, by way of example, as before, it is assumed that "0" is connected to $O_2$, "0" is connected to $\overline{CE_2}$ of the storage component 2. As a result it is only possible to address one storage position for a data word in the storage component 2, whereas all the other storage components are blocked from address input (as already mentioned above, "0" is connected to the input $\overline{CE_1}$ of all the storage components). The two-bit address component of the address thus has now addressed an associated storage component. The eight-bit address component addresses a storage position therein, for a data word. In this case, a data word is written in or read out to or from only one storage component—in the example the storage component 2—by way of the associated data word input and output, in dependence upon the manner in which the relevant read/write input and the direction transfer input 24 are set.

If a "1" is connected to the input 13 and to the channel transfer input 23, the bidirectional bus switches $SS_1$ to $SS_4$ and the unidirectional bus switch $US_6$ are locked, whereas the unidirectional bus switch $US_7$ is unlocked. The locking or unlocking of the bidirectional bus switches $SS_{51}$ to $SS_{54}$ is now dependent upon the output state of the decoder unit DC. In each case, for one of four different input states (in the example these are the states "0" "0"; "0" "1"; "0" and "1" "1"), the 1-out-of-4 decoder unit DC selects one of the outputs $O_1$ to $O_4$ in which it connects the latter to "0", whereas the other three outputs are switched to a "1". If, for example, the output $O_2$ is switched to a "0", all of the inputs $\overline{CS}$ of the bidirectional bus switches $SS_{51}$, $SS_{53}$ and $SS_{54}$ are connected to a "0", whereas the input $\overline{CS}$ of the bus switch $SS_{52}$ is connected to a "1". As a result, the bus switches $SS_{51}$, $SS_{53}$ and $SS_{54}$ are locked, whereas the bus switch $SS_{52}$ is unlocked. The address path now corresponds to the direction of the arrow 12 and the data path to the direction of the double-headed arrow 22 in FIG. 1.

The eight-bit component of an address which has been input by way of the address input $a_2$ is connected, as previously, to the address input A of every storage component. Again, as before, the two-bit address component is decoded by the 1-out-of-4 decoder unit DC. However, now a "1" is connected to the address mode transfer input 14, as a result of which, as described above, a data word is addressed only in one storage component. To enable a data word to be written in from the data word input and output $d_5$, a "0" is connected to the direction transfer input 24, as a result of which the bus switch $SS_{52}$ is switched in the direction from DOI to DBI. A "0" is connected to the read/write input R/W of the storage component 2. In order to enable a data word to be read out by way of the data word input and output $d_5$, a "1" is connected to the direction transfer input 24, whereas a "1" is connected to the read/write input R/W. This facilitates a serial access by way of the data word input and output $d_5$.

In the exemplary embodiment, the 1-out-of-4 decoder unit DC is constructed, for example, as an Intel Module 8205, which forms a 1-out-of-8 decoding. Here, the address input comprises only the two address terminals designated $A_0$ and $A_1$, whereas the third address terminal referenced $A_2$ is connected to a "0". The outputs are the outputs likewise designated $O_0$ to $O_3$. Of the additionally provided function inputs $E_1$, $E_2$ and $E_3$, the first two are always switched to a "0", whereas the input $E_3$ is always switched to a "1".

Figure 4:
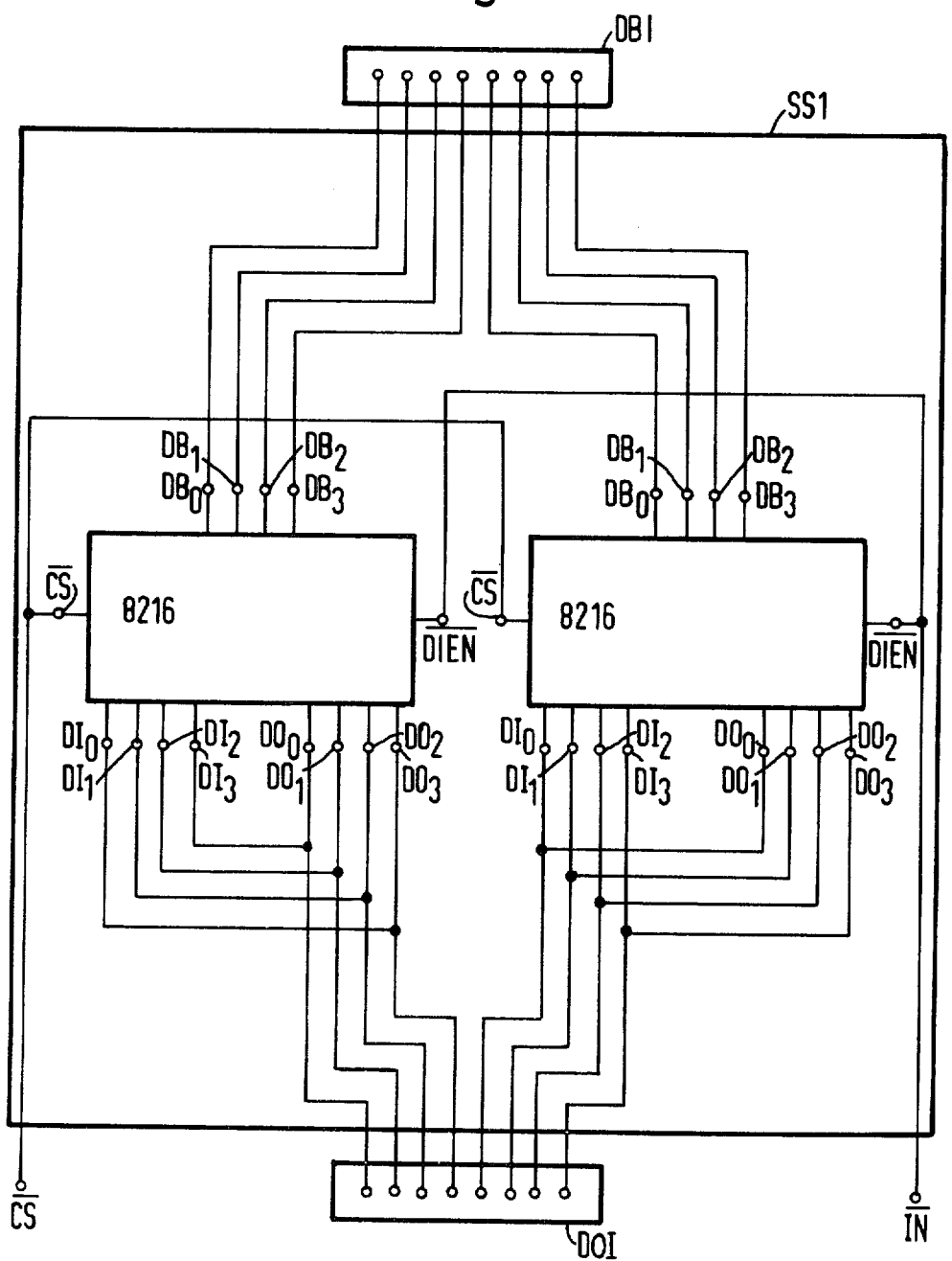
FIG. 4 illustrates the design of a bus switch employed in the exemplary embodiment of FIG. 2 for the construction of the two bus switches in the access control unit, using known modules.

FIG. 4 illustrates the construction of the bidirectional bus switch $SS_1$ which represents all of the other bidirectional bus switches. The bus switch comprises two Intel 8216 Modules. Each module has four-bit data inputs $DI_0$ to $DI_3$, four-bit data outputs $DO_0$ to $DO_3$, four-bit data inputs and outputs $DB_0$ to $DB_3$, one input $\overline{CS}$ and one input $\overline{DIEN}$. The data inputs and outputs of the two modules are combined to form the eight-bit data input and output DBI of the bidirectional switch $SS_1$. In each module the data outputs $DO_0$ to $DO_3$ are connected correspondingly to the data inputs $DI_0$ to $DI_3$. The data inputs $DI_0$ to $DI_3$ and thus also the data outputs $DO_0$ to $DO_3$ of the two modules are combined to form the eight-bit data input and output DOI of the bidirectional bus switch $SS_1$. The inputs $\overline{CS}$ and $\overline{DIEN}$ of the two modules are connected to the like-designated input $\overline{CS}$ and to the input $\overline{IN}$, respectively of the bidirectional switch $SS_1$. A "0" at the input $\overline{CS}$ unlocks the bus switch, whereas a "1" at the same input locks the bus switch.

Figure 5:
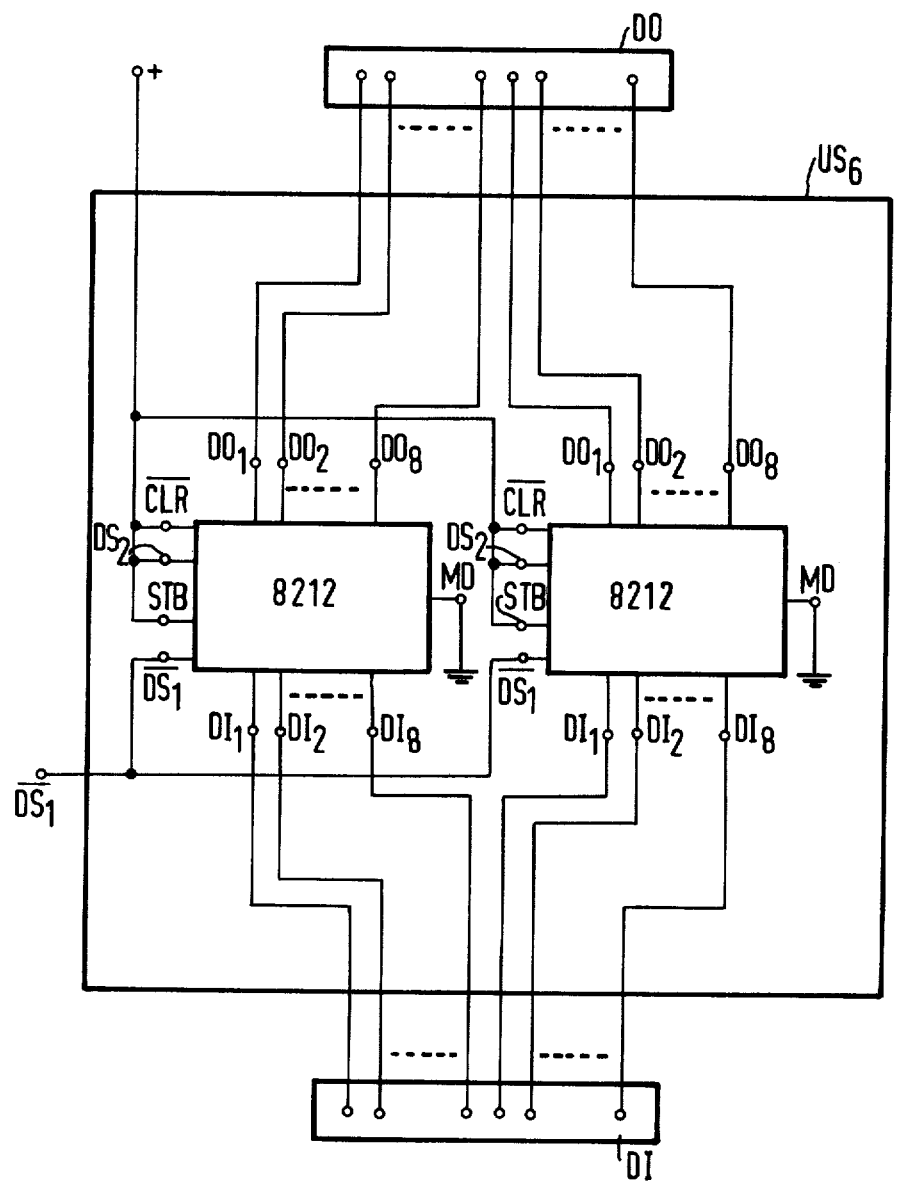
FIG. 5 illustrates the design of a bus switch, employed in the exemplary embodiment illustrated in FIG. 2, for the address decoder unit, using known modules.

FIG. 5 illustrates the construction of the unidirectional bus switch $US_6$ which comprises two 8212 Modules manufactured by the Intel Corporation. The bus switch $US_7$ is constructed in the same manner. The eight-bit data inputs $DI_1$ to $DI_8$ of every module together form 16-bit data input DI, whereas the eight-bit data outputs $DO_1$ to $DO_8$ of every module together form the 16-bit data output DO of the bus switch $US_6$. The inputs $\overline{CLR}$, $DS_2$ and STB of the two modules are always connected to a "1", whereas the inputs MD of the two modules are always connected to a "0". The inputs $\overline{DS_1}$ of the two modules are connected to the like-designated input $\overline{DS_1}$ of the bus switch $US_6$.

In the exemplary embodiment illustrated in FIG. 2, the superfluous six address lines of the address bus $DS_6$ are employed to switch the inputs $\overline{CE_1}$ of the storage components and the inputs $E_1$ and $E_2$ of the decoder unit DC to a "1" and "0", respectively. These lines are connected by way of an AND gate 100 which has an output and at least six inputs. The superfluous lines with the data bus $DS_6$ always exhibit a "1".

Furthermore, in the exemplary embodiment illustrated in FIG. 2, the controllable locking circuit which is assigned to every storage component and which releases or blocks the input of an address into this memory is composed of one of the AND gates $U_1$ to $U_4$ and of the circuit already formed in the storage module which is controllable by way of the input $\overline{CE_2}$.

It is also expedient, in the exemplary embodiment illustrated in FIG. 2, to connect the channel transfer input 23 to the address path transfer input 13, as a result of which the input 13 simultaneously assumes the function of the input 23 and one input is spared.

It must be expressly pointed out that a memory constructed in accordance with the invention can also be constructed with modules other than those used in the exemplary embodiment illustrated in FIG. 2. Instead of a positive logic, on which the exemplary embodiment shown in FIG. 2 is based, it is also possible to use a negative logic.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A computer system comprising:
   at least two individual computers;
   at least one system bus means interconnecting said computers,
   said system bus means including system data bus means and a system address bus means; and
   a plurality of traffic memories each connected between a respective computer and said system bus means,
   said system bus means comprising n (n=2, 3, ... ) system data buses for word-parallel traffic of n data words, and
   each of said traffic memories including means operable for optional word-parallel access in n times word width from the system data buses, and means operable for word sequential access in single word width selectively from the respectively computer and from one of said system data buses.

2. A computer system comprising:
   at least two individual computers;
   at least one system bus means interconnecting said computers,
   said system bus means including system data bus means and a system address bus means; and
   a plurality of traffic memories each connected between a respective computer and said system bus means,
   said system bus means comprising n (n=2, 3 ... ) system data buses for word-parallel traffic of n data words,
   each of said traffic memories including means operable for optional word-parallel access in n times word width from the system data buses, and means operable for word sequantial access in single word width selectively from the respective computer and from one of said system data buses,
   each of said traffic memories comprising n storage components,
   an access control circuit connected to said storage components and including means operable for optional access from n data word inputs/outputs in parallel to said storage components and means operable from an additional input/output to one of said storage components, and
   a controllable address decoder unit connected to said system address bus means, said address decoder unit including a first input and a second input and operable to select a first addressing mode in response to address signals at said first input and to select a second addressing mode in response to address signals at said first or second addressing inputs, wherein the first addressing mode provides that each address input at said first input addresses an associated storage position for a data word in each storage component and the second addressing mode provides that each address input at said first and second address inputs addresses an assigned storage position for a data word only in an assigned storage component.

3. The computer system of claim 2, wherein said data word buses connect said n data word inputs/outputs in parallel to the data word inputs/outputs of said storage component, and comprising a bidirectional bus driver in said data word buses including a locking input and a transfer input said data word inputs/outputs of each of said storage components connected by said data word buses to an additional data word input/output, and a further bidirectional bus switch interposed between said storage components and said additional data word input/output, said further bidirectional bus switch including a locking input and a transfer input.

4. The computer system of claim 3, wherein said address decoder unit comprises two unidirectional bus switches, each including a locking input for receiving locking signals and each including a data word input, the data word input of one of said unidirectional bus switches connected to said first address input and the data word input of the other of said bus switches connected to said second address input, each of said unidirectional bus switches including a data word output connected to the address inputs of said storage components by means of a data word bus, said data word output of each of said unidirectional bus switches including output terminals and the output terminals of the data word output of each of said unidirectional bus switches which contain a storage component address connected to an address word input of said address decoder unit, said decoder unit being a 1-out-of-n decoder unit having n output, a plurality of controllable locking circuits, each of said locking circuits connected to a respective one of said n outputs of said decoder unit and connected to a respective storage component and operable to release or block the input of an address into the storage component in dependence upon whether it has been approached by the 1-out-of-n decoder unit, each of said locking circuits including a second input by way of which an address input into said memory can be released in response to receipt of a release signal, independently of the input connected to said decoder unit.

* * * * *